United States Patent [19]
Spencer

[11] Patent Number: 6,106,595
[45] Date of Patent: Aug. 22, 2000

[54] METHODS OF SELECTIVELY SEPARATING $CO_2$ FROM A MULTICOMPONENT GASEOUS STREAM

[76] Inventor: Dwain F. Spencer, 24 Fairway Pl., Half Moon Bay, Calif. 94019

[21] Appl. No.: 09/330,251

[22] Filed: Jun. 10, 1999

Related U.S. Application Data

[63] Continuation-in-part of application No. 09/067,937, Apr. 28, 1998, which is a continuation-in-part of application No. 08/923,172, Sep. 4, 1997, abandoned, which is a continuation of application No. 08/643,151, Apr. 30, 1996, Pat. No. 5,700,311.

[51] Int. Cl.$^7$ .................................................. B01D 53/78
[52] U.S. Cl. ........................... 95/236; 48/198.3; 423/220; 423/437.1; 585/15
[58] Field of Search .............................. 95/149, 153, 236, 95/193, 194, 227, 228; 96/242; 585/15; 423/220, 437.1; 422/243; 48/127.3, 127.5, 198.3, 197 R, 197 FM, 198.7, 190

[56] References Cited

U.S. PATENT DOCUMENTS

| | | | |
|---|---|---|---|
| 3,150,942 | 9/1964 | Vasan .......................................... | 95/115 |
| 3,359,744 | 12/1967 | Bolez et al. ............................... | 62/632 |
| 3,479,298 | 11/1969 | Sze et al. ................................. | 48/198.7 |
| 3,838,553 | 10/1974 | Doherty ....................................... | 95/98 |
| 4,235,607 | 11/1980 | Kinder et al. .......................... | 95/236 X |
| 4,861,351 | 8/1989 | Nicholas et al. ............................ | 95/93 |
| 5,397,553 | 3/1995 | Spencer ................................. | 48/190 X |
| 5,434,330 | 7/1995 | Hnatow et al. ........................ | 95/149 X |
| 5,562,891 | 10/1996 | Spencer et al. ....................... | 62/53.1 X |
| 5,600,044 | 2/1997 | Colle et al. ............................ | 95/153 X |
| 5,700,311 | 12/1997 | Spencer ..................................... | 95/236 |

FOREIGN PATENT DOCUMENTS 3-164419  7/1991  Japan .

OTHER PUBLICATIONS

* Applicant's Parent Case.
Austvik, T. et al., "Deposition Of $CO_2$ On The Seabed In The Form Of Hydrates," *Energy Convers. Mgmt.* (1992) vol. 33, No. (5–8):659–666.
Golomb, D.S. et al., "The Fate of $CO_2$ Sequestered In The Deep Ocean," *Energy Convers. Mgmt.* (1992) vol. 33, No. (5–8):675–683.
Nishikawa, Nobuyuki et al., "$CO_2$ Clathrate Formation and its Properties in the Simulated Deep Ocean," *Energy Convers. Mgmt.* (1992) vol. 33, No. (5–8):651–657.
Saji, A. et al., "Fixation of Carbon Dioxide By Clathrate–Hydrate," *Energy Convers. Mgmt.* (1992) vol. 33, No. (5–8):643–649.
Spencer, D.F., "A Preliminary Assessment of Carbon Dioxide Mitigation Options," *Annu. Rev. Energy Enviorn.* (1991) vol. 16:259–273.
Spencer, D.F. et al., "Innovative CO2 Separation and Sequestration Processes for Treating Multicomponent Gas Streams," freely distributed by authors prior to filing date but after Apr. 28, 1997.

*Primary Examiner*—Richard L. Chiesa
*Attorney, Agent, or Firm*—Bozicevic, Field & Francis; Bret Field

[57] ABSTRACT

Methods are provided for the selective removal of $CO_2$ from a multicomponent gaseous stream to provide a $CO_2$ depleted gaseous stream having at least a reduction in the concentration of $CO_2$ relative to the untreated multicomponent gaseous stream. In the subject methods, the multicomponent gaseous stream is contacted with $CO_2$ nucleated water under conditions of selective $CO_2$ clathrate formation, where the $CO_2$ nucleated water serves as a liquid absorbent or adsorbent to produce a $CO_2$ clathrate slurry and $CO_2$ depleted gaseous stream. In a preferred embodiment, the $CO_2$ clathrate slurry is then decomposed to produce $CO_2$ gas and nucleated water. The subject methods find use in a variety of applications where it is desired to selectively remove $CO_2$ from a multicomponent gaseous stream, including chemical feedstock processing applications and air emissions control applications.

14 Claims, 2 Drawing Sheets

$CO_2$ Hydrate Process For Gas Separation From A Shifted Synthesis Gas Stream
(High Pressure $CO_2$ Regeneration for Disposal or Utilization)

$CO_2$ Hydrate Process For Gas Separation From A Shifted Synthesis Gas Stream (High Pressure $CO_2$ Regeneration for Disposal or Utilization)

CO2 Hydrate Process For Gas Separation From A Shifted Synthesis Gas Stream (Once-Through Ocean Water/Hydrate Slurry Disposal)

METHODS OF SELECTIVELY SEPARATING CO₂ FROM A MULTICOMPONENT GASEOUS STREAM

CROSS REFERENCE TO RELATED APPLICATIONS

This application is a continuation in part of application Ser. No. 09/067,937 filed on Apr. 28, 1998, which application is a continuation in part of application Ser. No. 08/923,172, filed on Sep. 4, 1997 now abandoned, which application is a continuation of application Ser. No. 08/643,151 filed on Apr. 30, 1996, now U.S. Pat. No. 5,700,311, the disclosures of which are herein incorporated by reference.

INTRODUCTION

1. Field of the Invention

The field of this invention is selective absorption of $CO_2$ gas.

2. Introduction

In many applications where mixtures of two or more gaseous components are present it is often desirable to selectively remove one or more of the component gases from the gaseous stream. Of increasing interest in a variety of industrial applications, including power generation, chemical synthesis, natural gas upgrading, and conversion of methane hydrates to hydrogen and $CO_2$, is the selective removal of $CO_2$ from multicomponent gaseous streams.

An example of where selective $CO_2$ removal from a multicomponent gaseous stream is desirable is the processing of synthesis gas or syngas. Syngas is a mixture of hydrogen, carbon monoxide and $CO_2$ that is readily produced from fossil fuels and finds use both as a fuel and as a chemical feedstock. In many applications involving syngas, the carbon monoxide is converted to hydrogen and additional $CO_2$ via the water-gas shift process. It is then often desirable to separate the $CO_2$ from the hydrogen to obtain a pure $H_2$ stream for subsequent use, e.g. as a fuel or feedstock.

As man made $CO_2$ is increasingly viewed as a pollutant, another area in which it is desirable to separate $CO_2$ from a multicomponent gaseous stream is in the area of pollution control. Emissions from industrial facilities, such as manufacturing and power generation facilities, often comprise $CO_2$. In such instances, it is often desirable to at least reduce the $CO_2$ concentration of the emissions. The $CO_2$ may be removed prior to combustion in some cases and post combustion in others.

A variety of processes have been developed for removing or isolating a particular gaseous component from a multicomponent gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated.

Gas absorption finds widespread use in the separation of $CO_2$ from multicomponent gaseous streams. In $CO_2$ gas absorption processes that currently find use, the following steps are employed: (1) absorption of $CO_2$ from the gaseous stream by a host solvent, e.g. monoethanolamine; (2) removal of $CO_2$ from the host solvent, e.g. by steam stripping; and (3) compression of the stripped $CO_2$ for disposal, e.g. by sequestration through deposition in the deep ocean or ground aquifers.

Although these processes have proved successful for the selective removal of $CO_2$ from a multicomponent gaseous stream, they are energy intensive. For example, using the above processes employing monoethanolamine as the selective absorbent solvent to remove $CO_2$ from effluent flue gas generated by a power plant often requires 25 to 30% of the available energy generated by the plant. In most situations, this energy requirement, as well as the additional cost for removing the $CO_2$ from the flue gas, is prohibitive.

Accordingly, there is continued interest in the development of less energy intensive processes for the selective removal of $CO_2$ from multicomponent gaseous streams. Ideally, alternative $CO_2$ removal processes should be simple, require inexpensive materials and low energy inputs, and be low in cost for separation and sequestration of the $CO_2$. For applications in which it is desired to effectively sequester the separated $CO_2$, of particular interest would be the development of alternative $CO_2$ absorbents or adsorbents from which the absorbed or adsorbed $CO_2$ could be effectively and efficiently stripped at high pressure prior to further compression and sequestration. Of particular interest would be the development of a system which minimizes parasitic energy losses for all process steps necessary to produce a high pressure $CO_2$ gas stream for disposal (sequestration and utilization).

Relevant Literature

Patents disclosing methods of selectively removing one or more components from a multicomponent gaseous stream include: U.S. Pat. Nos. 3,150,942; 3,838,553; 3,359,744; 3,479,298; 4,253,607; 4,861,351; 5,387,553; 5,434,330; 5,562,891 and 5,600,044.

Reports summarizing currently available processes for reducing the $CO_2$ content of multicomponent gaseous streams, such as coal fired power plant emissions, include: Smelser, S. C. et al., "Engineering and Economic Evaluation of $CO_2$ Removal From Fossil-Fuel-Fired Powerplants, Vol. 1: Pulverized-Coal-Fired Powerplants," EPRI IE-7365 Vol. 1 and Vol. 2; Coal Gasification-Combined Cycle Power Plants, EPRI IE-7365, Vol. 2.

Other publications discussing $CO_2$ clathrate formation include Japanese unexamined patent application 3-164419, Nishikawa et al., "$CO_2$ Clathrate Formation and its Properties in the Simulated Deep Ocean," Energy Convers. Mgmt. (1992) 33:651–657; Saji et al., "Fixation of Carbon Dioxide by Clathrate-Hyrdrate," Energy Convers. Mgmt. (1992) 33: 643–649; Austvik & Løken, "Deposition of $CO_2$ on the Seabed in the Form of Clathrates," Energy Convers. Mgmt. (1992) 33: 659–666; Golumb et al., "The Fate of $CO_2$ Sequestered in the Deep Ocean," Energy Convers. Mgmt. (1992) 33: 675–683; Spencer, "A Preliminary Assessment of Carbon Dioxide Mitigation Options," Annu. Rev. Energy Environ. (1991) 16: 259–273; Spener & North, "Ocean Systems for Managing the Global Carbon Cycle," Energy Convers. Mgmt. (1997) 38 Suppl.: 265–272; and Spencer & White, "Sequestration Processes for Treating Multicomponent Gas Streams," Proceedings of $23^{rd}$ Coal and Fuel Systems Conference, Clearwater, Fla. (March 1998).

SUMMARY OF THE INVENTION

Methods are provided for the selective removal of $CO_2$ from a multicomponent gaseous stream. In the subject methods, a multicomponent gaseous stream comprising $CO_2$ is contacted with $CO_2$ nucleated water in which hydrate precursors are contained under conditions of selective $CO_2$ clathrate formation, conveniently in a reactor. The $CO_2$ nucleated water (hydrate precursor water) employed in the subject invention comprises dissolved $CO_2$ in the form of $CO_2$ hydrate or clathrate precursors, where the precursors are in metastable form. The $CO_2$ nucleated water (hydrate precursor water) may either be formed in situ in the reactor or in a separate reactor, where the water may be fresh or salt water. Once the $CO_2$ nucleated water is formed, it serves as a selective $CO_2$ liquid absorbent or adsorbent. Upon contact of the gaseous stream with the $CO_2$ nucleated water, $CO_2$ is selectively absorbed or adsorbed from the gaseous stream by the $CO_2$ nucleated water and concomitantly fixed as $CO_2$ clathrates to produce a $CO_2$ depleted multicomponent gaseous stream and a slurry of $CO_2$ clathrates. The resultant $CO_2$ depleted multicomponent gaseous stream is then separated from the $CO_2$ clathrate slurry, either in the reactor itself or in a downstream separator. In a preferred embodiment, the resultant slurry is then treated in a manner sufficient to decompose the $CO_2$ hydrates to produce a moderate to high pressure $CO_2$ gas and $CO_2$ nucleated water. The process is suitable for use with a wide variety of multicomponent gaseous streams.

DETAILED DESCRIPTION OF THE INVENTION

Methods for selectively removing $CO_2$ from a multicomponent gaseous stream are provided. In the subject methods, a multicomponent gaseous stream is contacted with $CO_2$ nucleated water under conditions of selective $CO_2$ clathrate formation, conveniently in a reactor. The $CO_2$ nucleated water may be prepared in situ in the reactor, or in a separate reactor, where the water may be either fresh or salt water. Upon contact of the gaseous stream with the $CO_2$ nucleated water, $CO_2$ is selectively absorbed from the gaseous stream by the $CO_2$ nucleated water and concomitantly fixed in the form of the $CO_2$ clathrates. Contact results in the production of a $CO_2$ depleted gaseous stream and a slurry of $CO_2$ clathrates, which are then separated. In a preferred embodiment, the $CO_2$ clathrate or hydrate slurry is treated to decompose the $CO_2$ hydrates to produce a moderate to high pressure $CO_2$ gas and $CO_2$ nucleated water. The subject invention finds use in the treatment of a variety of multicomponent gaseous streams.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Critical to the subject invention is the use of $CO_2$ nucleated water containing $CO_2$ hydrate precursors as a liquid that selectively absorbs or adsorbs the gaseous $CO_2$ from the multicomponent gas phase stream. The $CO_2$ nucleated water employed in the subject invention comprises dissolved $CO_2$ in the form of $CO_2$ hydrate or clathrate precursors, where the precursors are in metastable form. The mole fraction of $CO_2$ in the $CO_2$ nucleated water ranges from about 0.01 to 0.10, usually from about 0.02 to 0.08, more usually from about 0.04 to 0.06. The temperature of the $CO_2$ nucleated water will typically range from about −1.5 to 10° C., preferably from about −1.5 to 5° C., and more preferably from about −1.5 to 0.5° C.

Figure 1:
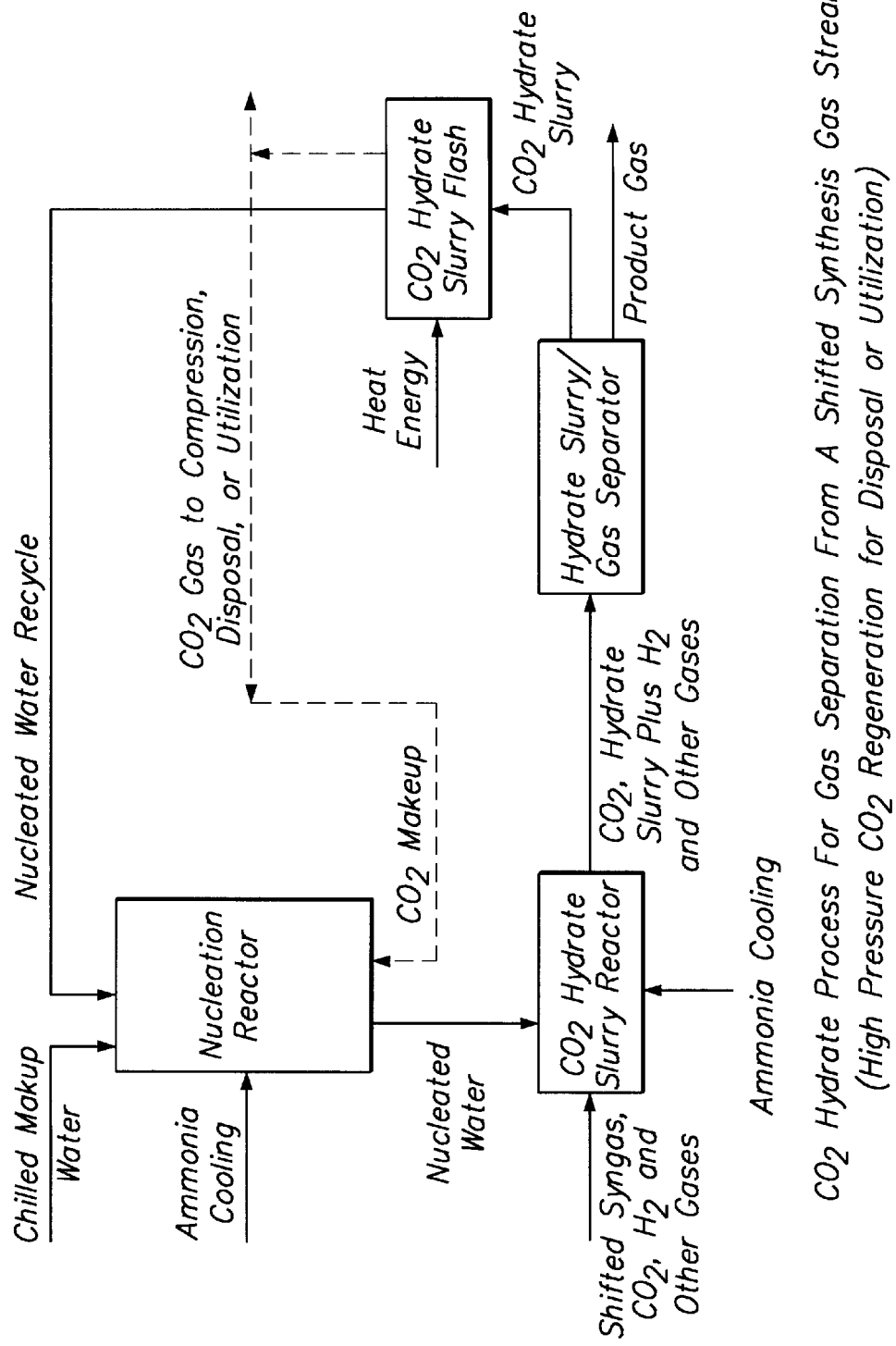
FIG. 1 provides a flow diagram of a first preferred embodiment of the subject invention.
Figure 2:
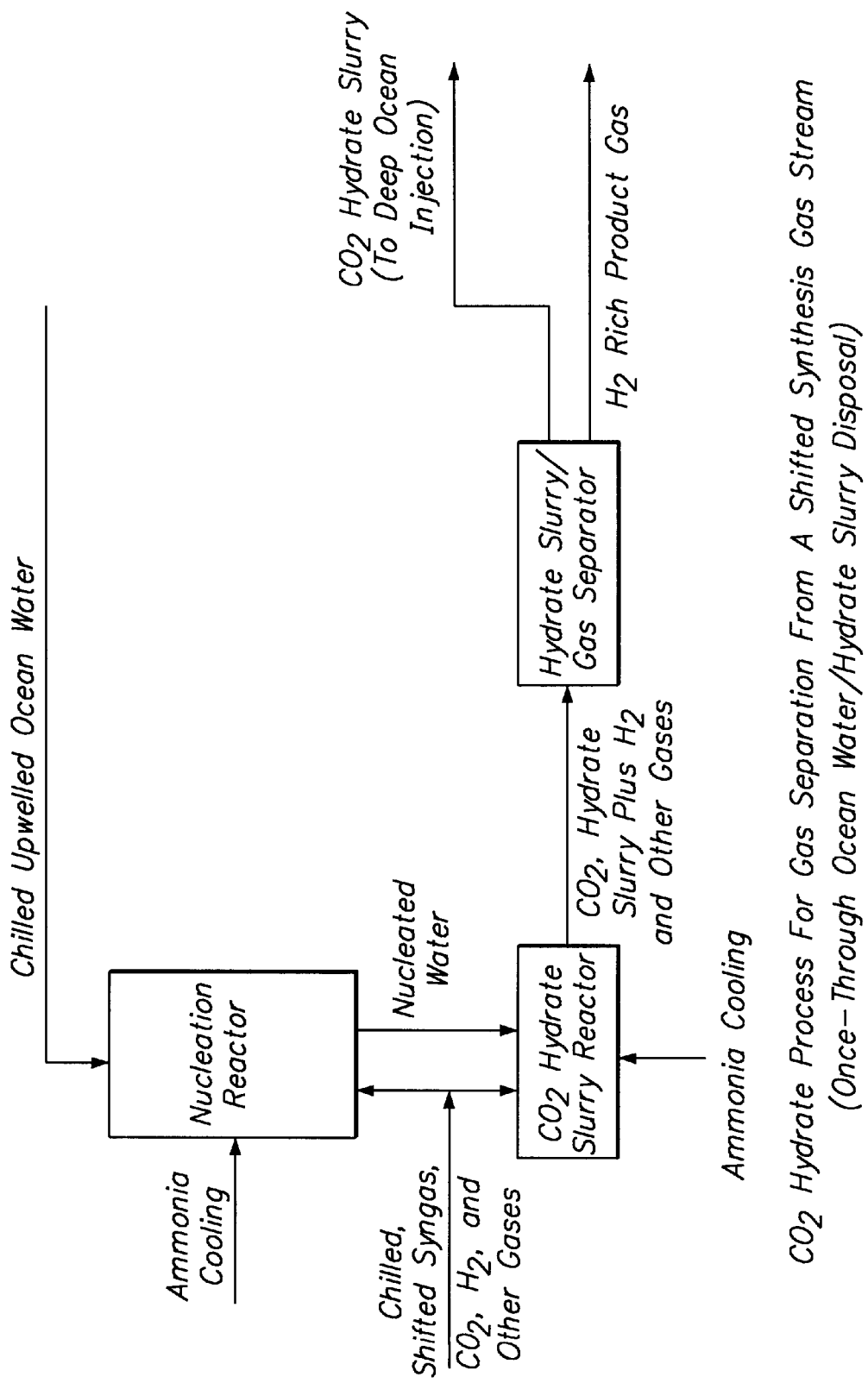
FIG. 2 provides a flow diagram of a second preferred embodiment of the subject invention.

$CO_2$ nucleated water employed in the subject methods as the selective liquid absorbent or adsorbent may be prepared using any convenient means. One convenient means of obtaining $CO_2$ nucleated water is described in U.S. application Ser. No. 08/291,593, filed Aug. 16, 1994, now U.S. Pat. No. 5,562,891, the disclosure of which is herein incorporated by reference. In this method $CO_2$ is first dissolved in water using any convenient means, e.g. bubbling a stream of $CO_2$ gas through the water, injection of $CO_2$ into the water under conditions of sufficient mixing or agitation to provide for homogeneous dispersion of the $CO_2$ throughout the water, and the like, where the $CO_2$ source that is combined with the water in this first stage may be either in liquid or gaseous phase. Where gaseous $CO_2$ is combined with water to make the $CO_2$ nucleated water, the gaseous $CO_2$ will typically be pressurized, usually to partial pressures ranging between 6 to 50 atm, more usually between about 20 to 40 atm. The $CO_2$ may be derived from any convenient source. In a preferred embodiment, at least a portion of the $CO_2$ is gaseous $CO_2$ obtained from a $CO_2$ hydrate slurry decomposition step, as described in greater detail below. The water in which the $CO_2$ is dissolved may be fresh water or salt water, e.g. sea water. An example of a process which employs freshwater based $CO_2$ nucleated water is provided in FIG. 1 while an example of a process which employs sea water based $CO_2$ nucleated water is provided in FIG. 2. The temperature of the water will generally range from about −1.5 to 10° C., usually from about −1.5 to 5°C., more usually from about 0 to 1° C.

The water that is used to produce the nucleated water may be obtained from any convenient source, where convenient sources include the deep ocean, deep fresh water aquifers, powerplant cooling ponds, and the like, and cooled to the required reactor conditions. In certain embodiments, the nucleated water may be recycled from a downstream source, such a clathrate slurry heat exchanger/decomposition source (as described in greater detail below) where such recycled nucleated water may be supplemented as necessary with additional water, which water may or may not be newly synthesized nucleated water as described above.

The amount of $CO_2$ which is dissolved in the water will be determined in view of the desired $CO_2$ mole fraction of the $CO_2$ nucleated water to be contacted with the gaseous stream. One means of obtaining $CO_2$ nucleated water having relatively high mole fractions of $CO_2$ is to produce a slurry of $CO_2$ clathrates and then decompose the clathrates by lowering the pressure and/or raising the temperature of the slurry to release $CO_2$ and regenerate a partially nucleated water stream. Generally, nucleated water having higher mole fractions of $CO_2$ are desired because it more readily accepts $CO_2$ absorption or adsorption and excludes formation of other hydrate compounds. By high mole fraction of $CO_2$ is meant a mole fraction of about 0.06 to 0.10, usually from about 0.07 to 0.09.

The production of $CO_2$ nucleated water may conveniently be carried out in a nucleation reactor. The reactor may be packed with a variety of materials, where particular materials of interest are those which promote the formation of $CO_2$ nucleated water with hydrate precursors and include:

stainless steel rings, carbon steel rings, and the like, to promote gas-liquid contact. To ensure that the optimal temperature is maintained in the nucleation reactor, active coolant means may be employed. Any convenient coolant means may be used, where the coolant means will typically comprise a coolant medium housed in a container which contacts the reactor, preferably with a large surface area of contact, such as coils around and/or within the reactor or at least a portion thereof, such as the lower portion of the reactor. Coolant materials or media of interest include ammonia, HCFCs, and the like, where a particular coolant material of interest is ammonia, where the ammonia is maintained at a temperature of from about 0 to 10° C. The surface of the cooling coils, or a portion thereof, may be coated with a catalyst material, such as an oxide of aluminum, iron, chromium, titanium, and the like, to accelerate $CO_2$ hydrate precursor formation. Additionally, hydrate crystal seeding or a small (1–3 atm) pressure swing may be utilized to enhance hydrate precursor formation.

In a preferred embodiment of the subject invention, the $CO_2$ nucleated water is prepared by contacting water (e.g. fresh or salt water) with high pressure, substantially pure $CO_2$ gas provided from an external high pressure $CO_2$ gas source. In this embodiment, the water is contacted with substantially pure $CO_2$ gas which is at a pressure that is about equal to or slightly above the total multicomponent gaseous stream pressure. As such, the pressure of the substantially pure $CO_2$ gas typically ranges in many embodiments from about 5 to 7 atm above the multicomponent gaseous stream pressure, and may be 10 to 50, usually 10 to 40 and more usually 15 to 30 atm above the $CO_2$ partial pressure of the multicomponent gaseous stream ($CO_2$ overpressure stimulation of hydrate precursor and hydrate formation). By substantially pure is meant that the $CO_2$ gas is at least 95% pure, usually at least 99% pure and more usually at least 99.9% pure. Advantages realized in this preferred embodiment include the production of $CO_2$ saturated water that comprises high amounts of dissolved $CO_2$, e.g. amounts (mole fractions) ranging from about 0.02 to 0.10, usually from about 0.04 to 0.08. Additional advantages include the use of relatively smaller nucleation reactors (as compared to nucleation reactors employed in other embodiments of the subject invention) and the production of more $CO_2$ selective nucleated water. In those embodiments where small nucleation reactors are employed, it may be desirable to batch produce the $CO_2$ saturated water, e.g. by producing the total requisite amount of $CO_2$ saturated water in portions and storing the saturated water in a high pressure reservoir. The $CO_2$ saturated water is readily converted to nucleated water, i.e. water laden with $CO_2$ hydrate precursors, using any convenient means, e.g. by temperature cycling, contact with catalysts, pressure cycling, etc.

The first step of the subject method is to contact the multicomponent gaseous stream with CO, nucleated water under conditions of $CO_2$ clathrate formation, preferably under conditions of selective $CO_2$ clathrate formation. The $CO_2$ nucleated water may be contacted with the gaseous stream using any convenient means. Preferred means of contacting the $CO_2$ nucleated water with the gaseous stream are those means that provide for efficient absorption or adsorption of the $CO_2$ from the gas through solvation of the gaseous $CO_2$ in the liquid phase $CO_2$ nucleated water. Means that may be employed include concurrent contacting means, i.e. contact between unidirectionally flowing gaseous and liquid phase streams, countercurrent means, i.e. contact between oppositely flowing gaseous and liquid phase streams, and the like. Thus, contact may be accomplished through use of spray, tray, or packed column reactors, and the like, as may be convenient.

Generally, contact between the multicomponent gaseous stream and the nucleated water is carried out in a hydrate or clathrate formation reactor. The reactor may be fabricated from a variety of materials, where particular materials of interest are those which promote the formation of $CO_2$ clathrates or hydrates and include: stainless steel, carbon steel, and the like. The reactor surface, or a portion thereof, may be coated with a catalyst material, such as an oxide of aluminum, iron, chromium, titanium, and the like, to accelerate $CO_2$ hydrate formation. To ensure that the optimal temperature is maintained in the hydrate formation reactor, active coolant means may be employed. Any convenient coolant means may be used, where the coolant means will typically comprise a coolant medium housed in a container which contacts the reactor, preferably with a large surface area of contact, such as coils around or within the reactor or at least a portion thereof, such as the exit plenum of the reactor. Coolant materials or media of interest include ammonia, HCFCs and the like, where a particular coolant material of interest is ammonia, where the ammonia is maintained at a temperature of from about 0 to 10° C. Where the reactor comprises gas injectors as the means for achieving contact to produce clathrates, the reactor may comprise 1 or a plurality of such injectors. In such reactors, the number of injectors will range from 1 to about 20 or more, where multiple injectors provide for greater throughput and thus greater clathrate production. Specific examples of various reactors that may be employed for clathrate production are provided in U.S. application Ser. No. 09/067,937, the disclosure of which is herein incorporated by reference.

The clathrate formation conditions under which the gaseous and liquid phase streams are contacted, particularly the temperature and pressure, may vary but will preferably be selected so as to provide for the selective formation of $CO_2$ clathrates, to the exclusion of clathrate formation of other components of the multi-component gaseous stream, unless such gases can be efficiently removed with the $CO_2$, e.g. $H_2S$. Generally, the temperature at which the gaseous and liquid phases are contacted will range from about −1.5 to 10° C., usually from about −1.5 to 5° C., more usually from about 0 to 1° C. The $CO_2$ partial pressure or the total pressure in the reactor will generally be at least about 3–5 atm to 6 atm, usually at least about 8 atm, and more usually at least about 10 atm, but will generally not exceed 60 atm, and more usually will not exceed 30 atm, where higher pressures are required when higher temperatures are employed, and vice versa, or where high pressure gases are conveniently available from the upstream process or processes.

Upon contact of the gaseous stream with the $CO_2$ nucleated water, $CO_2$ is selectively absorbed or adsorbed from the gaseous stream into the $CO_2$ nucleated water liquid phase. The absorbed or adsorbed $CO_2$ is concomitantly fixed as solid $CO_2$ clathrates in the liquid phase. Contact between the gaseous and liquid phases results in the production of a $CO_2$ depleted multicomponent gaseous stream and a slurry of $CO_2$ clathrates. In the $CO_2$ depleted multicomponent gaseous stream, the $CO_2$ concentration is reduced by at least about 50%, usually by at least about 70%, and more usually by at least about 90%, as compared to the untreated multicomponent gaseous stream. In other words, contact of the multicomponent gaseous stream with the $CO_2$ nucleated water results in at least a decrease in the concentration of the $CO_2$ of the gaseous phase, where the decrease will be at least about 50%, usually at least about 70%, more usually at least about 90%. In some instances the concentration of $CO_2$ in the gaseous phase may be reduced to the level where it does not exceed 1% (v/v), such that the treated gaseous stream is effectively free of $CO_2$ solute gas.

As discussed above, the $CO_2$ absorbed or adsorbed by the $CO_2$ nucleated water is concomitantly fixed in the form of stable $CO_2$ clathrates. Fixation of the $CO_2$ in the form of stable $CO_2$ clathrates results in the conversion of the $CO_2$ nucleated water to a slurry of $CO_2$ clathrates. The slurry of $CO_2$ clathrates produced upon contact of the gaseous stream with the $CO_2$ nucleated water comprises $CO_2$ stably fixed in the form of $CO_2$ clathrates and water. Typical mole fractions of $CO_2$ in stable clathrates are 0.12 to 0.15, as compared to 0.02 to 0.04 in the $CO_2$ nucleated water.

As described above, the $CO_2$ nucleated water that serves as the selective liquid absorbent or adsorbent for the $CO_2$ solute gas of the multicomponent gaseous stream is produced by dissolving $CO_2$ in water. As such, in some embodiments of the subject invention, $CO_2$ free water may be contacted with the multicomponent gaseous stream under appropriate conditions to first produce the $CO_2$ nucleated water, where contact will be subsequently maintained to produce the $CO_2$ clathrate slurry. In other words, the separate steps of $CO_2$ nucleated water production and the contact between the gaseous stream and the $CO_2$ nucleated water are combined into one continuous process.

In a preferred embodiment of the subject invention, the $CO_2$ containing gas and the nucleated water are injected into the reactor in directions normal to each other, e.g. the $CO_2$ containing gas is injected into the hydrate reactor along the centerline of the reactor while the nucleated water is injected into the reactor from the sides of the reactor such that the multicomponent gaseous stream is injected into the reactor in a direction substantially normal to the $CO_2$ nucleated water. In certain preferred embodiments, the water flows into an annulus surrounding the multicomponent gaseous stream containing the $CO_2$ and the two streams mix in the hydrate reaction zone. Thus, this nucleated water educts the $CO_2$ containing gaseous stream into the hydrate reactor. This embodiment of the subject invention provides a number of advantages over other embodiments of the invention, as described above. These benefits include one or more of: use of injection nozzles with smaller diameters; formation of $CO_2$ hydrates at lower equivalent pressures, e.g. down to 3 to 6 atm; reduction in the number of $CO_2$ hydrate reactors needed for a given volume of gas to be treated; enhancement of the mixing of the multicomponent gaseous stream with the nucleated water; and enhancement in the selectivity of $CO_2$ absorption or adsorption from the multicomponent gaseous stream.

In certain embodiments, an analogous step is employed in the nucleation reactor to produce the $CO_2$ nucleated water. In these embodiments, the $CO_2$ containing gaseous stream and the water are injected into the reactor in directions normal to each other, e.g. the $CO_2$ containing gaseous stream is injected along the centerline of the nucleation reactor and the water is injected into the nucleation reactor in a direction substantially normal to the centerline of the reactor. In certain preferred embodiments, the water flows into an annulus surrounding the gaseous stream containing the $CO_2$ and the two streams mix in the reaction zone.

The second step of the subject method is the separation of the treated gaseous phase from the $CO_2$ clathrate slurry. As convenient, the gaseous phase may be separated from the slurry in the reactor or in a downstream gas-liquid separator. Any convenient gas-liquid phase separation means may be employed, where a number of such means are known in the art. In many preferred embodiments, the gas-liquid separator that is employed is a horizontal separator with one or more, usually a plurality of, gas off takes on the top of the separator. The subject invention provides for extremely high recovery rates of the multicomponent gaseous stream. In other words, the amount of non-$CO_2$ gases removed from the multicomponent gaseous stream following selective $CO_2$ extraction according to the subject invention are extremely low. For example, where the multicomponent gaseous stream is a shifted synthesis gas stream, the amount of combustible gases (i.e. $H_2$, $CH_4$ and CO) recovered is above 99%, usually above 99.2% and more usually above 99.5%, where the amount recovered ranges in many embodiments from about 99.6 to 99.8%.

Where it is desired to sequester the $CO_2$ clathrates produced by the subject method, the resultant $CO_2$ clathrate slurry may be disposed of directly as is known in the art, e.g. through placement in gas wells, the deep ocean or freshwater aquifers, (See FIG. 2) and the like, or subsequently processed to separate the clathrates from the remaining nucleated water, where the isolated clathrates may then be disposed of according to methods known in the art and the remaining nucleated water recycled for further use as a selective $CO_2$ absorbent in the subject methods, and the like.

Where desired, $CO_2$ can easily be regenerated from the clathrates, e.g. where $CO_2$ is to be a product, using known methods. The resultant $CO_2$ gas may be disposed of by transport to the deep ocean or ground aquifers, or used in a variety of processes, e.g. enhanced oil recovery, coal bed methane recovery, or further processed to form metal carbonates, e.g. $MgCO_3$, for fixation and sequestration.

In a preferred embodiment, the $CO_2$ hydrate slurry is treated in a manner sufficient to decompose the hydrate slurry into $CO_2$ gas and $CO_2$ nucleated water, i.e. it is subjected to a decomposition step. Typically, the $CO_2$ hydrate slurry is thermally treated, e.g. flashed, where by thermally treated is meant that temperature of the $CO_2$ hydrate slurry is raised in sufficient magnitude to decompose the hydrates and produce $CO_2$ gas. Typically, the temperature of the $CO_2$ hydrate slurry is raised to a temperature of between about 40 to 50° F., at a pressure ranging from about 20 to 50 atm, usually from about 40 to 60 atm. One convenient means of thermally treating the $CO_2$ hydrate slurry is in a counterflow heat exchanger, where the heat exchanger comprises a heating medium in a containment means that provides for optimal surface area contact with the clathrate slurry. Any convenient heating medium may be employed, where specific heating media of interest include: ammonia, HCFC's and the like, with ammonia vapor at a temperature ranging from 20 to 40° C. being of particular interest. Preferably, the ammonia vapor is that vapor produced in cooling the nucleation and/or hydrate formation reactors, as described in greater detail in terms of the figures.

In a preferred embodiment, the decomposition of the $CO_2$ hydrates is initiated using steam. In certain embodiments, moderate to high pressure steam is injected directly into the $CO_2$ clathrate slurry. By moderate pressure steam is meant steam at a pressure ranging from about 3 to 20 atm, usually from about 6 to 10 atm. Where moderate pressure steam is employed, the temperature ranges from about 135 to 210° C., usually from about 160 to 182° C. By high pressure steam is meant steam at a pressure ranging from about 20 to 100 atm, usually from about 40 to 60 atm. Where high pressure steam is employed, the temperature of the steam ranges from about 215 to 400° C., usually from about 260 to 310° C. In an alternative embodiment, low to moderate pressure steam is employed in the heat exchanger without direct contact between the steam and the hydrate slurry. By low to moderate pressure steam is meant steam at a pressure ranging from about 2 to 20 atm, usually from about 3 to 6 atm. Where low pressure steam is employed, the temperature of steam ranges from about 120 to 215° C., usually from about 135 to 160° C. A number of advantages are provided by these embodiments in which steam is employed. These advantages include: increased ammonia cooling efficiency, decreased use of parasitic power, the opportunity to reduce or even eliminate water makeup requirements in those embodiments where steam is injected directly into the hydrate slurry, and the like.

Many embodiments of the subject invention provide for extremely efficient regeneration of moderate to high pressure $CO_2$ gas from the $CO_2$ slurry in the flash reactor. Thus, the subject methods can be used to regenerate a $CO_2$ gaseous product that is at a pressure only slightly less than the total system pressure. As such, the $CO_2$ gaseous product that is produced from the flash reactor may range in pressure from about 7 to 60 atm, usually from about 10 to 40 atm in those systems where the overall pressure ranges from about 10 to 65 atm, usually from about 15 to 45 atm. Furthermore, a substantial amount of the energy required to generate the moderate to high pressure $CO_2$ product gas may be derived solely from the coolant medium (e.g. ammonia) that is employed elsewhere in the system, e.g. in cooling of the nucleation and/or hydrate formation reactors, etc., where by substantial amount is meant at least about 60%, usually at least about 70% and more usually at least about 80%, where in some cases as much as 85%, 90% or more of the energy required to produce the $CO_2$ product gas in the flash step may be derived from the coolant medium. Thus, the subject invention efficiently provides for a very small pressure differential between the total system pressure and the pressure of the regenerated $CO_2$ gaseous product and utilizes heat generated in forming the hydrates and other heat sources for regenerating the $CO_2$ gaseous stream. This feature provides for an extremely energy efficient process in that the ammonia or other coolant medium is condensed at 10 to 15° C. as opposed to 25 to 40° C. which is required in other processes.

In certain preferred embodiments, a hydrate slurry high pressure pump is employed to pressurize the hydrate slurry to high pressures before it is subjected to the above hydrate decomposition procedure. In these embodiments, the hydrate slurry is pressurized to pressures ranging from about 75 to 170 atm, usually from about 80 to 100 atm. Any convenient high pressure slurry pump may be employed which is capable of pressurizing the slurry to the requisite pressure. Benefits which are provided by this embodiment include the ability to decompose the $CO_2$ hydrate slurry into $CO_2$ above its critical pressure and water. In these embodiments, the $CO_2$ liquid/gas is above its critical pressure and does not require further compression for disposal or utilization. A supercritical $CO_2$/water separator is also employed, e.g. a horizontal separator.

Following separation of the $CO_2$ from the clathrate slurry, the resultant water may be recycled as $CO_2$ partially nucleated water to separate $CO_2$ from additional quantities of the multicomponent gaseous stream. Where the water is recycled for further use as nucleated water, it may be necessary to add additional quantities of water, e.g. make up water. The amount of water that is added typically does not exceed about 0.1%, and usually does not exceed about 0.05%. In addition, $CO_2$ may be added. Where $CO_2$ is added, the amount of $CO_2$ that is added typically does not exceed about 6.0%, and usually does not exceed about 5.0%. In preferred embodiments, the $CO_2$ that is added is high pressure, substantially pure $CO_2$, as described above.

In the particular embodiment where the partially nucleated water is recycled, this water may contain a homogenous dispersed or dissolved catalyst, such as a metal oxide, to promote hydrate precursor formation. Since nearly all of the hydrate water is recycled, there is minimal loss of the homogenous dispersed or dissolved catalyst, again making the process very efficient.

A variety of multicomponent gaseous streams are amenable to treatment according to the subject methods. Multicomponent gaseous streams that may be treated according to the subject invention will comprise at least two different gaseous components and may comprise five or more different gaseous components, where at least one of the gaseous components will be $CO_2$, where the other component or components may be one or more of $N_2$, $O_2$, $H_2O$, $CH_4$, $H_2$, CO and the like, as well as one or more trace gases, e.g. $H_2S$. The total pressure of the gas will generally be at least about 20 atm, usually at least about 40 atm and more usually at least about 70 atm. The mole fraction of $CO_2$ in the multicomponent gaseous streams amenable to treatment according to the subject invention will typically range from about 25 to 65, usually from about 30 to 60, more usually from about 0.40 to 0.50. Generally, the partial pressure of $CO_2$ in the multicomponent gaseous stream will be at least about 5 to 6 atm, where in many embodiments the partial pressure of the $CO_2$ will be least about 10 atm and as great as 50 atm. As mentioned above, by controlling the clathrate formation conditions of contact appropriately, contact between the $CO_2$ nucleated water and the gas can be controlled to provide for the selective formation of $CO_2$ clathrates, e.g. through use of highly nucleated water containing hydrate precursors, and perhaps dissolved or dispersed catalysts, which further aids the selective absorption or adsorption of the $CO_2$ gas. The particular conditions which provide for the best selectivity with a particular gas can readily be determined empirically by those of skill in the art. Particular multicomponent gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas hydrates, and the like. Where the gaseous stream is at atmospheric pressure, it will generally be compressed to at least a minimal pressure required for $CO_2$ hydrate formation, e.g. about 6 atm.

Generally, the partial pressure of each of the components of the multicomponent gaseous medium will be such that $CO_2$ is selectively absorbed or adsorbed by the nucleated water and other components are not. As such, the partial pressure of $CO_2$ in the multicomponent gaseous stream will be sufficiently high and the partial pressure of each of the other components of the multicomponent gaseous stream will be sufficiently low to provide for the desired selective $CO_2$ absorption or adsorption.

Multicomponent gaseous mediums in which the partial pressures of each of the components are suitable for selective $CO_2$ hydrate formation according to the subject invention may be treated directly without any pretreatment or processing. For those multicomponent gaseous mediums that are not readily suitable for treatment by the subject invention, e.g. in which the partial pressure of $CO_2$ is too low and/or the partial pressure of the other components are too high, may be subjected to a pretreatment or preprocessing step in order to modulate the characteristics of the gaseous medium so that is suitable for treatment by the subject method. Illustrative pretreatment or preprocessing steps include: temperature modulation, e.g. heating or cooling, decompression, compression, incorporation of additional components, e.g. $CO_2$, and the like.

One particular multicomponent gas of interest that may be treated according to the subject invention is natural well head gas, e.g. natural gas comprising one or more lower alkyls, such as methane, ethane, butane and the like. Where the gas conditions are appropriate, $CO_2$ may be separated from the gas according to the subject invention directly at the well head site without modification or processing of the gas. For example, if the wellhead gas has a total pressure of approximately 60 to 70 atm, a temperature of 0 to 5° C. and consists substantially of $CO_2$ and methane, where the amount of $CO_2$ present in the gas is greater than about 50 volume %, the wellhead gas can be treated without modification according to the subject invention. Conversely, where the temperature of the well head gas is closer to 10° C., as long as the partial pressure of $CO_2$ in the methane/$CO_2$ mixture is at least 30 atm and the partial pressure of methane is below 60 atm, the wellhead gas can be processed without pretreatment. Where the well head gas conditions are not directly suitable for treatment, the wellhead gas may be processed to make it suitable for treatment as described above, where processing includes temperature modulation, e.g. heating or cooling, decompression and/or recompression, incorporation of additional components, e.g. $CO_2$, and the like. For example, where the concentration of $CO_2$ in the wellhead gas is from about 15 to 50% and the temperature is from 0 to 5° C., the gas stream can be treated by decompressing it in a manner sufficient to maintain the partial pressure of the $CO_2$ component above 10 atm and achieve a partial pressure of methane that is below 20 atm.

For the treatment of a shifted coal gasification product gas, the untreated gas will typically comprise $H_2$, $H_2O$, $CO_2$ and trace gases, where the mole fraction of $CO_2$ will range from about 0.30 to 0.45, and will be at a temperature ranging from about 20 to 30° C. and a pressure ranging from about 20 to 40 atm. The product gas will first be cooled to a temperature ranging from −30 to 0° C. and then contacted with $CO_2$ nucleated water, as described above, to produce $CO_2$ depleted shifted coal gasification product gas and a slurry of $CO_2$ clathrates. The resultant $CO_2$ depleted product gas and $CO_2$ clathrate slurry may then be separated and the product gas used as a fuel or for chemical synthesis. Where the shifted coal gas comprises trace amounts of $H_2S$, $H_2S$ will generally be present in amounts ranging from 0 to 2.0 mole percent or 0 to 3.6 weight percent. In such cases, the $H_2S$ will either be dissolved in the excess slurry water or will form hydrates along with the $CO_2$ and therefore be separated from the multicomponent gaseous stream, obviating the need for subsequent $H_2S$ removal steps.

Yet another type of multicomponent gas that is particularly suited for treatment according to the subject invention is powerplant gas produced by the use of pure oxygen instead of air in the combustion of organic fuels, such as coal, oil or natural gas. In a preferred embodiment, this powerplant flue gas is compressed to 6 to 20 atm and contacted with $CO_2$ nucleated water. The resultant hydrate slurry is nearly pure and is then pumped to 75 to 170 atm, which can then be flashed as described above to produce $CO_2$ gas and nucleated water, where the $CO_2$ gas can then be disposed of or utilized, e.g. in coal bed methane recovery or enhanced oil recovery.

The subject methods and systems provide for a number of advantages. First, the subject methods provide for extremely high $CO_2$ removal rates from the multicomponent gaseous stream. In many embodiments, the $CO_2$ removal rate exceeds about 75%. In yet other embodiments, the $CO_2$ removal rate may exceed about 90% or even 95%, and may be substantially 100% in many embodiments. The subject invention also allows for high recovery rates of selective non-$CO_2$ gases, e.g. $H_2S$, in the multicomponent gaseous stream, where recovery rates of non-$CO_2$ gases may be as high as 95% or higher, and in many embodiments are higher than 99%. Finally, the subject invention provides for low parasitic energy use, where the percentage of the total energy output of a given system that must be devoted to selective $CO_2$ removal may be as low as 5% or lower, and in many embodiments may be as low as 3.5% or lower.

It is evident from the above that a simple and efficient method for the selective removal of $CO_2$ from a multicomponent gaseous stream is provided. By using $CO_2$ nucleated water containing hydrate precursors as a selective $CO_2$ absorbents or adsorbents, great efficiencies are achieved through reductions in the overall energy input requirements and the number of steps necessary for complete $CO_2$ removal, fixation and disposal. In particular, by using $CO_2$ nucleated water as the absorbent or adsorbent, $CO_2$ is readily removed from the gaseous stream and immediately fixed in a form suitable for disposal. By treating the resultant $CO_2$ hydrate slurry to produce $CO_2$ gas and nucleated water, even further reductions in parasitic energy loss are obtained, where such reductions stem from the use of recycled nucleated water, energy efficient recycled coolant medium, e.g. ammonia, and the like. Even further benefits are obtained in preferred embodiments where at least one of the following is present: (a) preparation of nucleated water with high pressure $CO_2$, i.e. the use of overpressure $CO_2$; (b) utilization of a dispersed or dissolved catalyst in nucleated water to promote hydrate precursor formation; (c) use of a hydrate reactor in which the multicomponent gaseous stream and the nucleated water are injected substantially normal to each other and mix in the reaction zone, e.g. the multicomponent gaseous stream is injected along the centerline of the reactor and the nucleated water is injected normally to the centerline, e.g. by injecting the water from an annulus surrounding the multicomponent gaseous stream; and (d) use of a heat decomposition step in which steam is employed, e.g. where a low to moderate pressure steam is employed in addition to the energy extracted from the coolant medium, e.g. ammonia.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for selectively removing $CO_2$ from a multicomponent gaseous stream to produce a $CO_2$ depleted gaseous stream, said method comprising:

(1) contacting said multicomponent gaseous stream with $CO_2$ nucleated water containing hydrate precursors formed by an over-pressurizing process under conditions of selective $CO_2$ clathrate formation, whereby $CO_2$ is absorbed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced; and (2) separating said $CO_2$ depleted gaseous stream from said $CO_2$ clathrate slurry;

wherein said method is further characterized by at least one of the following:

(a) preparing said nucleated water by contacting water with high pressure $CO_2$ gas;

(b) contacting said gaseous stream with said nucleated water in a hydrate formation reactor by injecting said $CO_2$ nucleated water and said gaseous stream normal to each other in said reactor; and (c) employing a homogenous catalyst in said nucleated water.

2. The method according to claim 1, wherein said method further comprises decomposing said $CO_2$ clathrate slurry to produce $CO_2$ gas and $CO_2$ nucleated water.

3. The method according to claim 1, wherein said $CO_2$ clathrate decomposition step comprises heating said $CO_2$ clathrate slurry.

4. The method according to claim 3, wherein said heating partially employs at least one of steam and energy obtained from other steps of the process.

5. The method according to claim 3, wherein said method further comprises raising or maintaining the pressure of said $CO_2$ clathrate slurry to or at a high pressure prior to said heating step.

6. The method according to claim 1, wherein said nucleated water is prepared from seawater.

7. The method according to claim 1, wherein said nucleated water is prepared from fresh water.

8. A method for selectively removing $CO_2$ from a multicomponent gaseous stream to produce a $CO_2$ depleted gaseous stream, said method comprising:

(1) preparing $CO_2$ nucleated water by contacting $CO_2$ gas with water in a nucleation reactor;

(2) contacting said multicomponent gaseous stream with said $CO_2$ nucleated water containing hydrate precursors formed by an over-pressurizing process in a $CO_2$ hydrate formation reactor under conditions of selective $CO_2$ clathrate formation, whereby $CO_2$ is removed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced;

(3) separating said $CO_2$ depleted gaseous stream from said $CO_2$ clathrate slurry; and (4) heating said $CO_2$ clathrate slurry in a manner sufficient to produce $CO_2$ gas and $CO_2$ nucleated water;

wherein said method is further characterized by at least one of the following:

(a) preparing said nucleated water by contacting water with high pressure $CO_2$ gas;

(b) contacting said gaseous stream with said nucleated water in said hydrate formation reactor by injecting said $CO_2$ nucleated water and said gaseous stream normal to each other in said reactor;

(c) using steam in said heating step;

(d) maintaining or raising the pressure of said $CO_2$ clathrate slurry to or at a high pressure prior to said heating step; and (e) employing a homogenous catalyst in said nucleated water.

9. The method according to claim 8, wherein said nucleated water is fresh water.

10. The method according to claim 8, wherein said preparing said nucleated water includes contacting water with high pressure $CO_2$ gas.

11. The method according to claim 8, wherein said method comprises contacting said gaseous stream with said nucleated water in said hydrate formation reactor by injecting said $CO_2$ nucleated water and said gaseous stream normal to each other in said reactor.

12. The method according to claim 8, wherein said heating partially employs at least one of steam and energy obtained from other steps of the process.

13. The method according to claim 8, wherein said method comprises raising the pressure of said $CO_2$ clathrate slurry to a high pressure prior to said heating step.

14. The method according to claim 8, wherein said $CO_2$ nucleated water production step comprises combining $CO_2$ nucleated water produced by heating said $CO_2$ clathrate slurry with additional make up water and $CO_2$ gas.

* * * * *